United States Patent [19]

Peters et al.

[11] 4,271,484

[45] Jun. 2, 1981

[54] CONDITION CODE ACCUMULATOR APPARATUS FOR A DATA PROCESSING SYSTEM

[75] Inventors: Arthur Peters, Sudbury; Virendra S. Negi, Pepperell, both of Mass.

[73] Assignee: Honeywell Information Systems Inc., Waltham, Mass.

[21] Appl. No.: 841

[22] Filed: Jan. 3, 1979

[51] Int. Cl.³ .................................................. G06F 11/30
[52] U.S. Cl. ...................................................... 364/900
[58] Field of Search ... 364/200 MS File, 900 MS File; 371/48, 55, 67, 69

[56] References Cited

U.S. PATENT DOCUMENTS

| 3,570,006 | 3/1971 | Hoff et al. | 364/200 |
| 3,593,297 | 7/1971 | Kadner | 364/200 |
| 3,696,340 | 10/1972 | Matsushita et al. | 364/200 |
| 3,875,565 | 4/1975 | Endou et al. | 364/200 |
| 3,980,991 | 9/1976 | Mercurio | 364/200 |

*Primary Examiner*—Melvin B. Chapnick
*Attorney, Agent, or Firm*—John S. Solakian; Nicholas Prasinos; Ronald R. Reiling

[57] ABSTRACT

Signals representing the past and present states of a condition under test during an instruction execution cycle, as well as a signal indicating that an execute cycle has taken place, are utilized as address signals applied to a memory which feeds an output to control a bistable element. The bistable element is set to the state of the memory output signal and supplies the address signal indicative of the past state of the condition under test. The memory is coded to respond at its output with signals controlling the bistable element such that once a given state of the condition under test is detected and stored in the bistable element, the latter is inhibited from switching regardless of any further changes in the condition under test during the current instruction execution cycle.

11 Claims, 7 Drawing Figures

| | CUM. COND. | EXEC. DEL. | CCD | R |
|---|---|---|---|---|
| I | 0 | 0 | X | 0 |
| II | 0 | 1 | 0 | 0 |
| III | 0 | 1 | 1 | 1 |
| IV | 1 | X | X | 1 |

CONDITION CODE ACCUMULATOR APPARATUS FOR A DATA PROCESSING SYSTEM

RELATED APPLICATIONS

The following applications are incorporated by reference to the instant application.
1. "Binary Coded Decimal Correction Apparatus" invented by Virendra S. Negi and Arthur Peters, filed on even date herewith and having Ser. No. 000,735 and assigned to the same assignee named herein.
2. "Control File Apparatus for a Data Processing System" invented by Virendra S. Negi and Arthur Peters, filed on even date herewith and having Ser. No. 000,733 and assigned to the same assignee named herein.
3. "Arithmetic Logic Apparatus for a Data Processing System" invented by Virendra S. Negi and Arthur Peters, filed on even date herewith and having Ser. No. 000,842 and assigned to the same assignee named herein.
4. "Control Store Address Generation Logic for a Data Processing System" invented by Arthur Peters and Virendra S. Negi, filed on even date herewith and having Ser. No. 000,864 and assigned to the same assignee named herein.

BACKGROUND OF THE INVENTION

The present invention relates to data processing systems, and more particularly to condition code accumulator apparatus used therein.

In the serial processing of data processing system instructions, it is often necessary to detect certain characteristics of operands, on a per-unit basis and retain a record of the result of inspecting the entire operand for a given characteristic. Typically, it is necessary to know if at least one instance of such certain characteristic has occurred. The logic of this requirement demands the ability to test for a given condition and to retain a record of a detection of the condition unaltered by the result of subsequent tests which may or may not be successful. A further requirement is that the condition under test be sampled only at certain times during the operational cycles of the data processing system. A method of the prior art for implementing such condition code accumulator is to feedback the output of a register into an OR gate with the other input being the condition under test, and clocking the output of such OR gate to set the register. Such prior art apparatus requires two clock pulses to insure that the recording register does not sense while in an unstable state. This technique of the prior art, besides requiring two separate clock pulses, further requires associated logic for insuring the correct accumulation of such conditions.

It is accordingly a primary object of the present invention to provide an improved condition code accumulator for use in a data processing system.

SUMMARY OF THE INVENTION

The above stated object and other objects are achieved according to the present invention by providing first storage apparatus having a plurality of inputs and an output, second storage apparatus having an input and an output, wherein the input of the second storage apparatus is coupled to the output of the first storage apparatus and wherein the output of the second storage apparatus is coupled to a first one of the inputs of the first storage apparatus. The second storage apparatus is used to store the state of a first signal which is the condition under test. Further apparatus is provided for coupling the first signal, and a second signal, which is indicative of the operation of the data processing system, to respective inputs of the first storage apparatus. Yet further apparatus is provided which is responsive to a clock signal and the second signal for storing the state of the first signal, i.e., the signal under test, in the second storage apparatus. Further apparatus is provided for inhibiting any change in state of the first signal as stored in the second storage apparatus, if, in fact, the second storage apparatus has stored therein the second state of the first signal.

BRIEF DESCRIPTION OF THE DRAWINGS

The above and other objects of the present invention are achieved in the illustrative embodiment as described with respect to the Figures in which.

DETAILED DESCRIPTION OF THE PREFERRED EMBODIMENT

Figure 1:
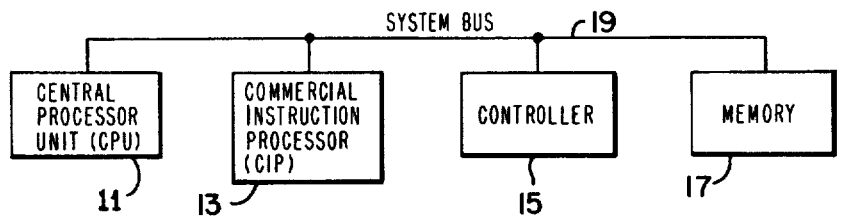
FIG. 1 illustrates the overall system configuration which incorporates the present invention.

Referring to FIG. 1, a commercial instruction processor (CIP) 13 is provided to expand the instruction set capabilities of CPU 11 by using a powerful set of commercial type instructions. These instruction types allow the CPU, via the CIP, to process decimal and alphanumeric data; the instruction types are listed as follows: Decimal, Alphanumeric, Data Conversion and Editing. CIP communication with the CPU and main memory 17 is conducted via a common system bus 19 under control of bus controller 15. The CIP operates as an attachment to the CPU and receives instructions and operands as transfers from the CPU and/or memory. The CIP executes the commercial instructions as they are sent over the bus 19 by the CPU 11. The CPU obtains these instructions from main memory, examining each fetched instruction specifically for a commercial instruction. Receipt of each commercial instruction by the CIP is usually concurrent with the CPU, as the CPU extracts and decodes each instruction from memory. However, CIP instruction execution is asynchronous with CPU operations. Any attempt to execute a commercial instruction when a CIP is not installed in the system causes the CPU to enter a specific trap condition.

The CIP receives information from the CPU and main memory via the bus 19, and processes this information in a logical sequence. This sequence consists of four CIP operational states as follows: idle state, load state, busy state and trap state.

Figure 2:
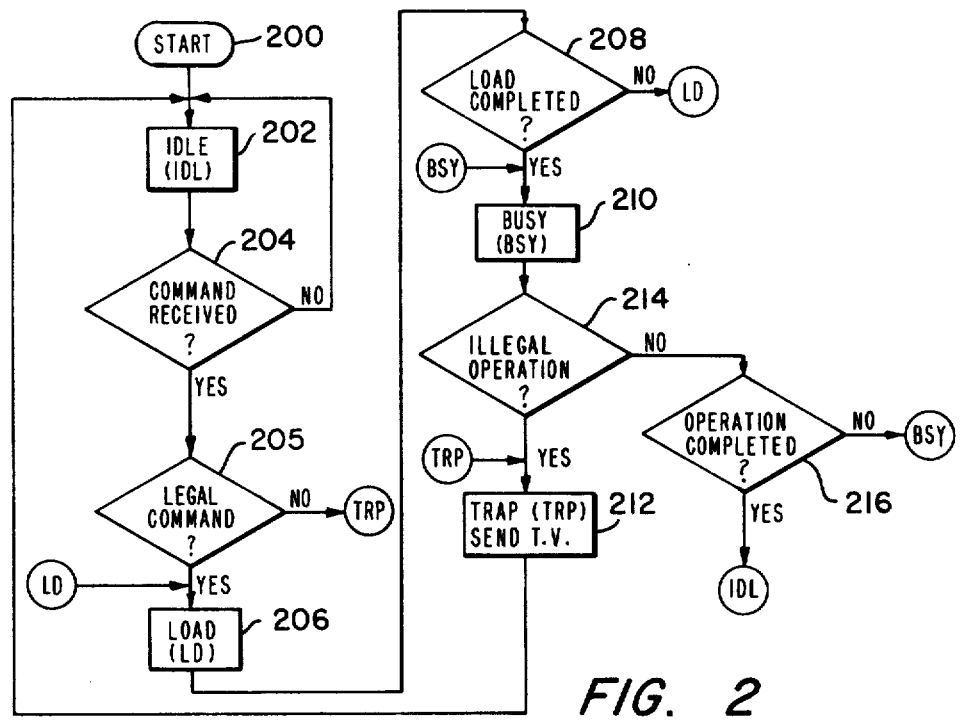
FIG. 2 is an operational sequence state diagram of the processor utilized in the implementation of the present invention.

As shown in FIG. 2, the CIP enters block 200 and remains in the idle state (block 202) when not processing information, and must be in the idle state to accept a command (i.e., a CIP instruction or an I/O command) from the CPU. On receipt of a command (block 204), if legal (block 205), the CIP enters the load state (block 206) and remains in the load state until all associated command information is received. When this information is successfully received (block 208), the CIP enters the busy state (block 210) to process the information. Any further attempts by the CPU to communicate with the CIP while in its busy state are not acknowledged by the CIP until it returns to the idle state again. CIP processing includes the communication activity with main memory that occurs when fetching the necessary operand(s). The CIP enters the trap state (block 212) only when specific illegal events occur (block 214), such as detection of an illegal operand length or an out of sequence command. Return is made to the idle state if the operation has been completed (block 216).

All pertinent instruction transfers to the CIP are performed jointly by the CPU and CIP. They are decoded and sent by the CPU to the CIP along with all of the pertinent information required for execution of the instruction. When the transfer of the information is completed, the CPU and CIP continue to process their respective instructions. Each CIP instruction contains a 16-bit wide instruction word that is immediately followed with up to six additional descriptive type words (also 16-bits wide), called data descriptors and labels. The instruction word contains the CIP op-code that is sent to the CIP for processing. The data descriptors describe the operand type, size, and location in memory; the label provides the address of a remote data descriptor. Both the data descriptor and the label are processed by the CPU; related information derived by this action, such as an operand type and memory address, is sent to the CIP for processing. The CPU accomplishes the preceding by analyzing the op-code that is contained in each instruction. When the CPU detects a CIP instruction (i.e., if the CIP is in the idle state), the CPU sends the instruction op-code and the related information in the following manner: (i) the CPU sends the op-code (i.e., the first word of the commercial instruction) to the CIP and the CIP enters the load state when it accepts the op-code; (ii) The CPU fetches the first data descriptor and interrogates the address syllable to generate the effective address; (iii) The CPU sends the following information: the 24-bit effective byte address of the first operand, the contents of the pertinent CPU data register, if applicable, and the data descriptor of the first operand, updated to reflect a byte (eight bits) or half-byte (four bits) digit position within a word. As second and third operands are encountered, the CPU performs the applicable procedures in steps ii and iii.

At this point, the CIP is loaded with all of the necessary information required to execute the commercial instruction and enters the busy state to execute the instruction. When necessary, the CIP communicates directly wit main memory to obtain the applicable operand(s). However, it should be noted that the CIP never directly accesses any CPU registers. It only uses information sent to it by the CPU. Hence, no CPU registers are modified by the CIP and the CPU continues to process the next and each succeeding CPU instruction until one of the following conditions occurrs: (i) the CIP, via a trap vector (TV), notifies the CPU that an illegal event occurred during the execution of the current commercial instruction; or (ii) an internal or external interrupt signal is detected by the CPU.

When an interrupt signal is detected by the CPU, the CPU responds in the following manner. The CPU determines whether or not the last commercial instruction was completed by the CIP. The CPU waits for completion of the last commercial instruction. When the last commercial instruction is completed, the CPU determines if it resulted in a trap request. If it did, the CPU honors the trap request before performing the interrupt. This results in a typical context save/restore operation to store all relevant CPU and CIP status information, as required. With the completion of the CPU operations required to process a CIP trap request, or when there is no trap request and a CIP instruction is available for processing, the CPU performs the following. The CPU updates its program counter to point to the commercial instruction it was attempting to initiate. The CPU defers the attempt to process the commercial instruction until the current interrupt is serviced. The CPU honors and services the interrupt caused by the external device.

As the CIP executes an instruction, all CPU registers, including those referenced by the current commercial instruction, can be altered by a program via CPU instructions. However, the software must not modify the operand for a commercial instruction until the CIP is through processing that instruction; otherwise, unspecified results will occur. Branch instructions included in the CIP instruction repertoire are executed synchronously by the CPU and the CIP.

The three types of data that make up the data words processed by the CIP are Alphanumeric Data, Binary Data and Decimal Data. Each data type is classified into units of binary information. By definition this unit, when used to reference alphanumeric and binary data characters equals eight bits (one byte); when used to reference decimal data characters, it equals four bits (half byte) for packed decimal data and eight bits (one byte) for string decimal data. Also, single precision binary numbers consist of two units (two bytes) and double precision binary numbers consist of four units (four bytes).

Figure 3:
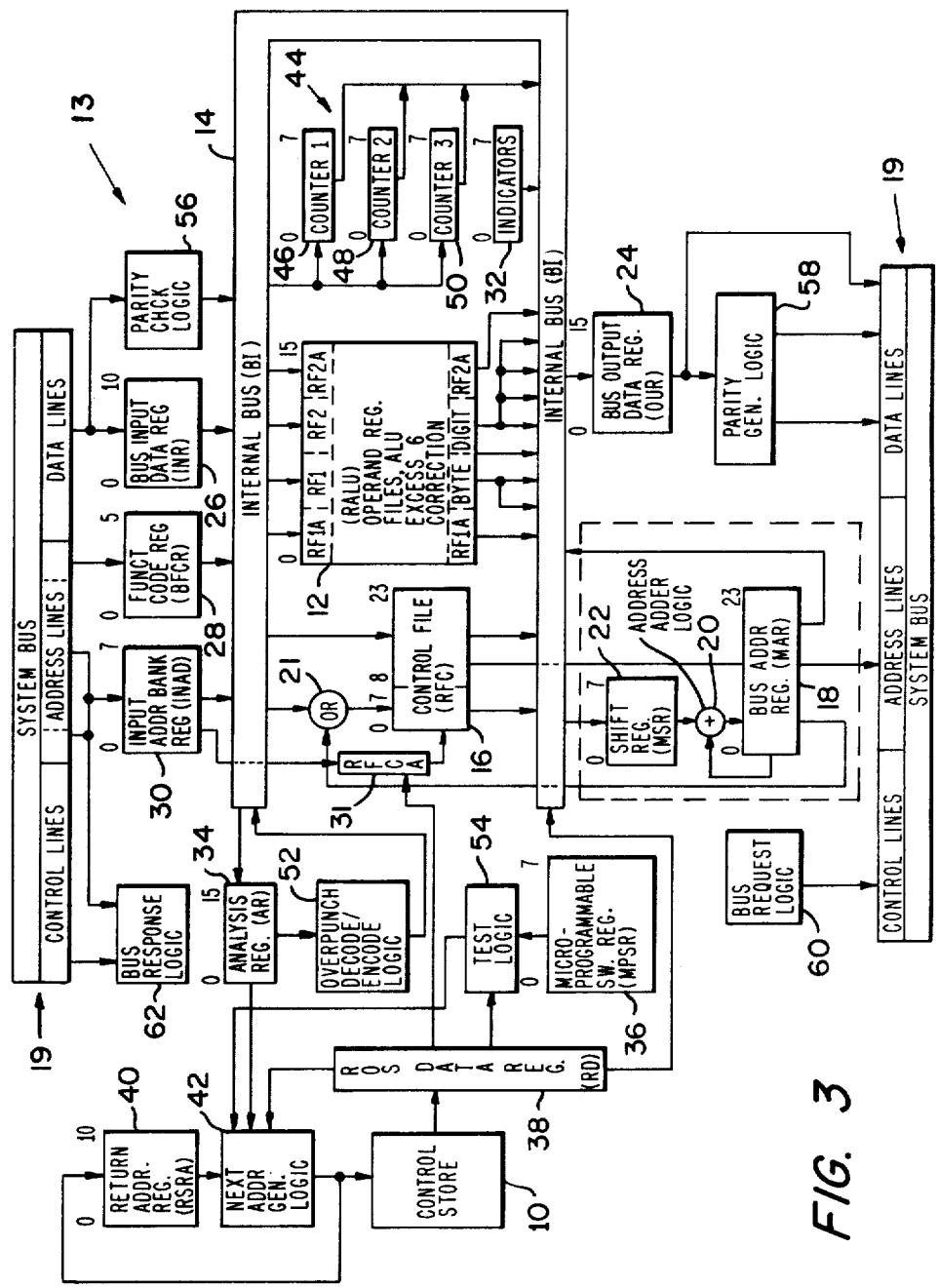
FIG. 3 is a block diagram of the commercial instruction processor utilized with the present invention.

FIG. 3 is a major block diagram of the commercial instruction processor 13 of the present invention, showing all the major data transfer paths between the processor's registers.

The control store 10 is comprised of a plurality of locations, one for each control store or firmware word. These firmware words directly or indirectly control the processor sequences, data transfer paths, and bus operations.

The operand register files and arithmetic logic unit (RALU) 12 primarily includes two register files, an arithmetic logic unit (ALU) and the associated multiplexers and control registers. Included in the RALU 12 are the operand register files (RF1 and RF2), each containing sixteen sixteen bit locations that are used to buffer operands for execution in the ALU. The ALU input multiplexers and latches are comprised of the following: three 2-to-1 multiplexers (zone selection), two 4-to-1 multiplexers (digit selection), and two 8-bit latches (byte latches). These multiplexers and latches are used to deliver data from the operand register files to the ALU. Data can also be transferred from a current product counter to the ALU or from operand register file 2 to a multiply register. The 8-bit ALU (which is comprised of two 4-bit ALU chips, a carry look-ahead chip, and a carry in/carry out flip-flop) is capable of performing the following logical operations on operands presented at its two inputs: Binary Add, Binary Subtract Input 1 from Input 2, Binary Subtract Input 2 from Input 1, Logical OR, Logical AND, Exclusive OR, Set ALU Output Equal to FF, and Clear ALU Output to 00. The RALU is discussed in detail with respect to FIG. 5.

The excess 6 (XS6) correction logic of the RALU is enabled whenever the ALU is in decimal mode, and is used to change the binary output from the adder to the correct decimal digit while modifying the carry output for subsequent operations. XS6 correction is accomplished by using a 32-bit by 8-bit PROM chip, which encodes the corrected three high-order bits of the digit and generates the corrected carry. A digit less than two function is also available on the output of the PROM chip for other controls. The ALU output multiplexer is used to feed either the upper four bits of the adder output or the correct decimal zone bits to the internal bus 14, depending on whether the ALU is operating in binary or decimal mode, respectively. The RALU control logic consists of three registers, which are as follows: RF1A—Register File 1 Address Register, RF2A—Register File 2 Address Register and ALMR—ALU Mode Control Register. These registers, in conjunction with several microinstructions, control all operations within the RALU. Besides the registers and control described previously, there are two other registers that are classified as RALU registers. These registers are the current product counter (CPRC) and the multiplier register (MIER), to be discussed hereinafter.

Still referring to FIG. 3, the control file 16, also referred to as register file C (RFC), is a 16 location by 24 bit random access memory (RAM) that is primarily used to store all instruction related information that originates from the CPU 11 (e.g., task words, data descriptors, effective addresses, etc.). The control file also contains several work locations which are used by the processor (CIP) firmware. The control file 16 receives bits 0-7 from either internal bus 14 or bus address register (MAR) 18 via OR logic multiplexer 21. The bus address register (MAR) 18 and address adder logic 20 shall now be discussed. The MAR register 18 is a 24-bit address register that is primarily used to address the system bus 19. It is comprised of an 8-bit, two-input multiplexer register on the low end and a 16-bit incrementor/decrementor on the high end. The multiplexed input into the lower eight bits is from either the control file 16 or the output of the address adder 20. The address adder 20 is an 8-bit two's complement adder unit that is primarily used for incrementing or decrementing the contents of the bus address register 18. The inputs to the address adder 20 are the low-order eight bits of the bus address register and the 8-bit shift register (MSR) 22. The shift register (MSR) 22 is an 8-bit universal shift register that can be loaded from the internal bus 14 and is capable of shifting left or right by one bit (i.e., open-end shift with zero-fill). The shift register functions as an input to the address adder 20 for incrementing or decrementing the bus address register 18. In addition, bit 0 of the shift register 22 can be loaded into the ALU carry-in flip-flop, which is useful during execution of the conversion instructions.

The bus output data register (OUR) 24 is a 16-bit data register that is used to transfer data onto the bus 19 data lines. It is loaded from the internal bus 14 with either the lower or upper byte on the entire 16-bit word. The bus input data register (INR) 26 is a 16-bit data register that is used to receive data from the bus 19 data lines. The contents of the input data register can be unloaded onto the internal bus 14.

The input function code register (BFCR) 28 is a 6-bit register that is used to store the function code when the CIP accepts any bus 19 input or output command. Subsequently, firmware examines the contents of the function code register 28 and executes the specified command. The input address bank register (INAD) 30 is an 8-bit register that is used to store the high-order eight memory address bits that are received over the bus 19 address lines. The high-order eight address bits contain the memory module address and are transmitted by the CPU 11 as the result of a so-called IOLD command or an output effective address function code. The low-order 16-bits of the memory address are received over the bus 19 data lines and are strobed into the INR register 26, forming the required 24-bit main memory address.

Figure 4:
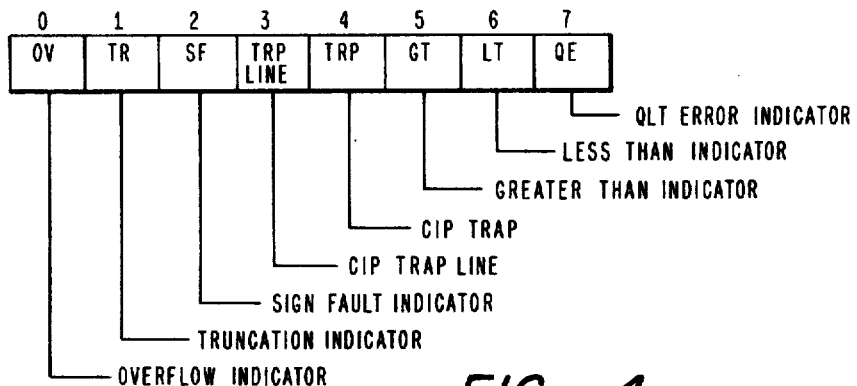
FIG. 4 illustrates the contents of one of the registers of the processor of the present invention.

The CIP indicator register 32 is an 8-bit storage register in which each bit can be individually set or reset. The indicator register bit configuration is shown in FIG. 4. The TRP and TRP LINE indicators are used by the CIP 13 for internal processing only and are not software visible. The TRP LINE (CIP trap line) indicator is used to inform the CPU 11 of an existing CIP trap condition and is transmitted over the bus 19 via the external trap signal. When set, the TRP (CIP trap) indicator allows the CIP to accept only input commands from the CPU.

The analysis register (AR) 34 is a 16-bit register that is primarily used to control microprogram branches (masked branches) and the over-punch byte encode/decode logic. This register is loaded with the entire 16-bit word from the internal bus 14. The microprogrammable switch register (MPSR) 36 is an 8-bit register in which each bit can be individually set or reset under microprogram control. Each bit within the MPSR register 36 is used as a flag to facilitate microprogramming (i.e., firmware can test each of the register bits and perform branch operations, depending on the test results). Some of these bits are also used to control certain CIP 13 hardware functions.

The ROS data register (RD) 38 is a 52-bit storage register that is used to store the control store output (firmware word) for the current firmware cycle. The microprogram return address register (RSRA) 40 is an 11-bit register that is loaded from the output of the next address generation (NAG) logic 42 and is used to store the microprogram return address when executing a firmware subroutine. The register file C address multiplexer/selector (RFCA) 31 is a 4-bit, 2-to-1 selector that is capable of addressing one of the 16 locations contained within register file C (i.e., control file) 16. This selector 31 selects a combination of the function code register 28 and either counter (1) 46 or selected bits of the ROS data register 38. The CIP counters 44 include three 8-bit up/down counters 46, 48 and 50 that are defined respectively as Counter 1 (CTR1), Counter 2 (CTR2), and Counter 3 (CTR3). These counters are loaded/unloaded via the internal bus 14. The contents of each counter are available for test and branch operations.

The overpunch byte decoder/encode logic 52 includes two 512-location by 4-bit PROM chips that are used to decode/encode the contents of the analysis register (AR) 34. The byte being decoded is obtained from AR bits 1 through 7 and the digit being encoded is obtained from AR bits 4 through 7. The decode/encode operation is accomplished by using AR bits 1 through 7 to address a specific PROM location. The contents of the specified PROM location are coded to conform to either: (1) the decoded digit, its sign, and its validity, or (2) the encoded overpunched byte. The MPSR 36-bit 4 specifies whether a decode or encode operation is performed, while MPSR bit 1 indicates the sign of the digit being encoded. Also, the output of the overpunch byte decode/encode logic is available on both halves of the internal bus 14.

The CIP test logic 54 selects one of 32 possible firmware test conditions for input to the next address generation logic 42. The true or false condition of the function being tested controls bit 50 of the control store next address field (i.e., sets or resets bit 50, depending on the condition of the tested function). The next address generation (NAG) logic 42 included in the CIP 13 uses one of the following five methods to generate the next firmware address: direct address, test and branch, masked branch, major branch, or subroutine return. Direct Address: this method is used when an unconditional branch is performed to the next sequential control store location. This is accomplished by using bits 41 through 51 of the control store word to form the next address. These bits comprise the next address (NA) field, which can directly address any of the available control store locations. Test and Branch: this method is used when a 2-way conditional branch (test condition satisfied) is performed within a firmware page (a firmware page being a 128-location segment within the control store). This is accomplished by using control store bits 41, 42, 43, 44 and 50 to select a test condition. Then, depending on the condition of the tested function, a branch is performed to one of two locations. The branch operation performed under this method is modulo 2 (i.e., the two possible branch addresses are two locations apart). The modulo 2 address is developed as follows: (1) if the test condition is satisfied, bit 9 of the address is set to a one, or (2) if the test condition is not satisfied, bit 9 of the address is set to a zero. Masked Branch: this method is normally used when branching on the contents of the analysis register (AR) 34 or certain other conditions, and provides branching to 2, 4, 8 or 16 locations within the same firmware page. Major Branch: this method is used when branching within a firmware page (128 words). A CPU/CIP interface routine uses this method to perform the required 16-way branch on the contents of the function code register 28. (INB Major Branch) and other control functions (EOP Major Branch). Subroutine Return: this method is used to return the firmware to the next odd or even control store location after execution of a firmware subroutine. The return address is obtained from the return address (RSRA) register 40, and must be stored in this register 40 prior to execution of the specified subroutine.

The internal bus 14 is 16-bits wide and is primarily used to transfer data between CIP registers, including locations within the register files. The internal bus receives data from several sources as shown in FIG. 2. Outputs from the internal bus 14 are fed to various registers within the CIP.

The parity checking logic 56 is coupled between the bus 19 and internal bus 14 and is used to check the parity of the incoming data. The parity generator logic 58, on the other hand, is used to generate the correct parity bit for transfer over the bus 19.

The bus request logic 60 and the bus response logic 62 are utilized for the purpose of enabling the CIP to gain access to the bus 19 and to respond to any requests to gain access to the CIP. Logic 60 and 62 are described in U.S. Pat. No. 3,993,981.

Figure 5:
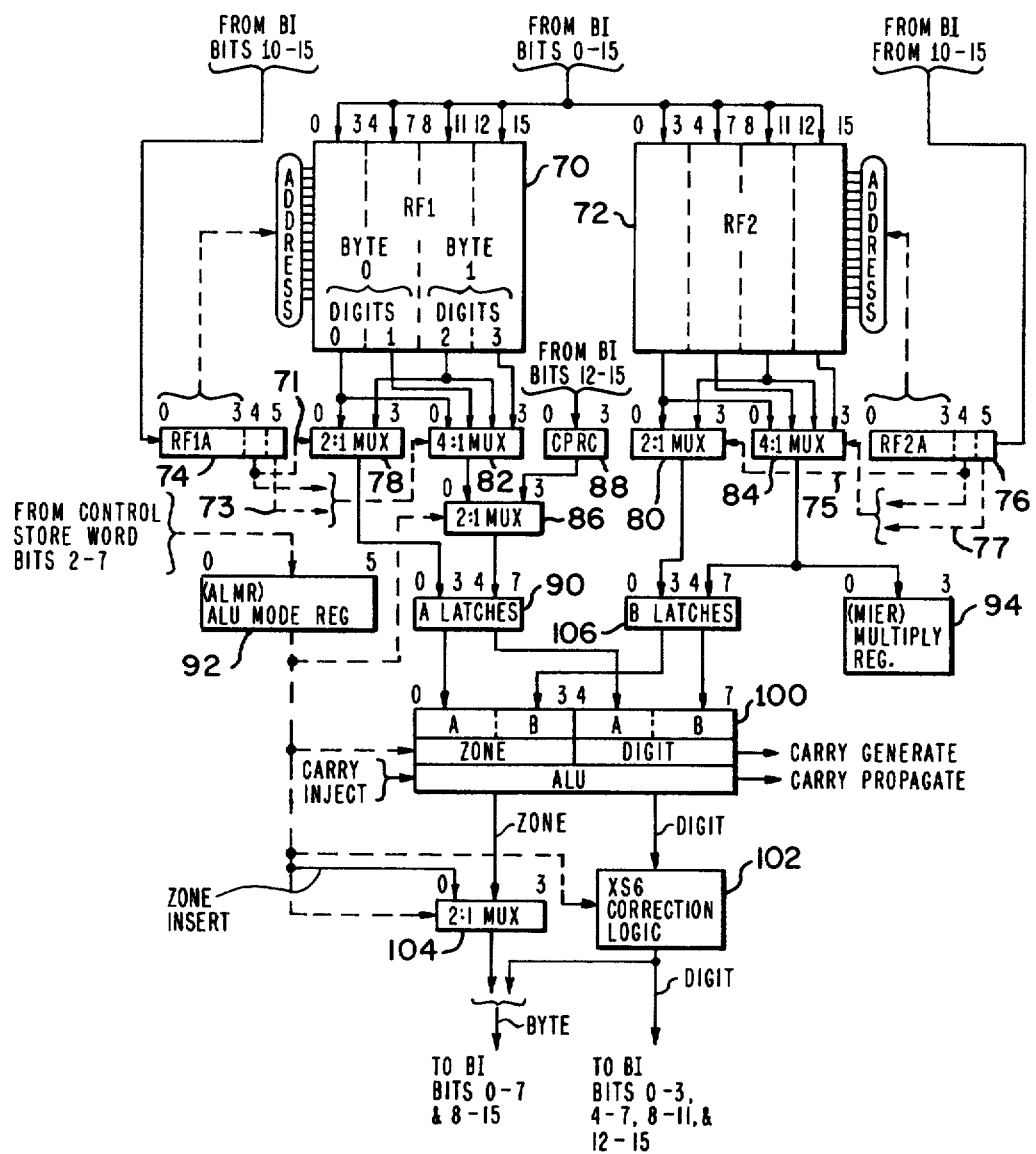
FIG. 5 is a detailed block diagram of the arithmetic unit utilized with the present invention.

FIG. 5 is a major block diagram of the RALU 12, showing all major data transfer paths and control lines. The control lines are shown as dashed lines for ease of understanding its operation. For convenience, the description of the RALU is divided into seven areas: Operand Register Files, ALU Input Multiplexers and Latches, Arithmetic Logic Unit, XS6 Correction Logic, ALU Output Multiplexer, RALU Control Logic, and Miscellaneous RALU Registers. Operand register files RF1 70 and RF2 72 each consist of four RAM chips that are used as temporary storage for CIP operands. Addresses for each of the register files are supplied by two 6-bit address registers (RF1A 74 and RF2A 76, respectively). Bits 0 through 3 of each address register supply the address of the location within the associated register file, while the low order bits provide for byte and digit selection at the output of the register file. Both of these address registers can be incremented or decremented by 1, 2 or 4 (i.e., by digits, bytes, or words). As shown in FIG. 5, the output from each register file is fed to the inputs of two multiplexers (i.e., a pair of multiplexers for each register file) that select between zone and digit information. The selection is accomplished by bits 4 and 5 of the associated address register. Bit 4 selects whether bits 0 through 3 or 8 through 11 (from the register file) are fed to the output of the 2-to-1 multiplexers 78 or 80 respectively, while bit 5 selects the register file bits that comprise the digit being fed to the output of the 4-to-1 multiplexers 82 or 84 respectively.

The various registers and multiplexers are coupled for control by various control lines, shown as dotted lines, and including, for example, control lines 71, 73, 75 and 77. A third 2-to-1 multiplexer 86 is used to select whether the contents of the current product counter (CPRC) 88 or the digit from RF1 is delivered to the A latches 90. This multiplexer is controlled by the ALMR register 92. The ALU input latches, A latches 90 and B latches 106, receive both zone and digit information from the ALU input multiplexers, and latch the data into the register files during write operations. The outputs from the latch circuits feed the zone and digit information to the left and right sides of the ALU, respectively.

The current product counter (CPRC) is a 4-bit decimal up/down counter that is primarily used during execution of decimal multiply and divide operations. The multiplier register (MIER) 94 is a 4-bit binary up/down counter that is primarily used during decimal multiply and divide operations. The ALU mode control register (ALMR) 92 is a 6-bit control register that is used to control all ALU operations. The register file 1 address register (RF1A) 74 is a 6-bit address register that performs two functions: (1) provide addresses for register file 1 (70), and (2) controls two of the three ALU input multiplexers associated with register file 1. The register file 2 address register (RF2A) 76 is a 6-bit address register that performs two functions: (1) provides addresses for register file 2 (72), and (2) controls the ALU input multiplexers associated with register file 2. All arithmetic logic unit (ALU) 100 operations are performed in either the decimal or binary mode. Decimal mode is used when operating the decimal digit information, while binary mode is used for byte (Alpha) operations. Both modes of operation also control the excess 6 (XS6) correction logic 102 and the inputs to the carry flip-flop. In decimal mode, the carry flip-flop is loaded with the carry from the low-order four bits of the ALU, while in binary mode, it is loaded with the carry from the eight bits of the ALU for subsequent arithmetic operations. The carry flip-flop is loaded under microprogram control when a carry must be propagated for subsequent operations. In addition, the carry flip-flop can be loaded from the MSR register, and set or reset under microprogram control.

The XS6 correction logic 102 has one 32-bit by 8-bit PROM chip and the associated control logic to correct the high-order three bits from the digit output of the ALU. XS6 correction is performed if: (1) the ALU is in decimal odd mode and a decimal carry is encountered or the digit output of the ALU 100 is greater than 9, and (2) in the decimal subtract mode, if a borrow is encountered (i.e., absence of a carry from the digit portion of the adder). The PROM chip has five address lines. Three of these lines consist of the three high-order bits from the digit output of the ALU, while the other two address lines indicate the type of operation being performed (i.e., add correction, subtract correction, or no correction). The coded contents of the PROM chip are the three high-order corrected bits of the digit, the corrected decimal carry, and the digit less than 2 condition.

The ALU output multiplexer 104 selects between the upper four bits of the adder output and the corrected decimal zone bits for delivery to the internal bus. The configuration of the zone bits (for decimal mode) depends on whether ASCII ior EBCDIC data is being used (i.e., if ASCII data is being used, the zone bits are forced to a value of 3; if EBCDIC data is being used, the zone bits are forced to a value of F).

The RALU controls consist of registers RF1A 74, RF2A 76, and ALMR 92 plus various RALU related microinstructions. In addition, the ALU carry flip-flop is under microprogram control. The carry flip-flop can be precleared or preset, (as required), by the respective microinstructions, and can be loaded from: (1) the 4-bit digit carry for decimal operations, (2) the 8-bit binary carry for binary operations, or (3) bit 0 of the MSR register 22 during execution of conversion instructions. The ALMR register 92, which controls all ALU operations, is loaded from control store bits 2 through 7. Bit 0 specifies whether the ALU operates in decimal or binary mode; i.e., whether the carry out of the ALU is from bit 4 (digit carry) or bit 0 (binary carry). Bit 0 also controls both the ALU correction (XS6) for decimal operations and the ALU output multiplexer 104; the multiplexer determines whether the high-order four bits of the ALU or the forced zone bits are gated to the internal bus 14. Bits 1, 2 and 3 are used to control operations within the ALU. Bit 4 specifies whether the zone bits are forced to a value of 3 or F (i.e., for ASCII data, the zone bits are forced to a value of 3; for EDCDIC data, the zone bits are forced to a value of F). Bit 5 specifies whether the selected digit from register file 1 or the contents of the current product counter 88 are gated to the latches 90 associated with the left side of the ALU. Register RF1A provides the address and controls for register file 1 and the associated ALU input multiplexers. Register RF2A provides the addresses and controls for register file 2 and the associated ALU input multiplexers.

The control film 16 is divided into two sections: the upper section (bits 0 through 7) and the lower section (bits 8 through 23). Each section of the control file can be loaded as follows: RFC lower from the internal bus (bits 0 through 15), RFC upper from the internal bus (bits 0 through 7), RFC lower from the internal bus (bits 0 through 15), and RFC upper from the bus address register 18 (bits 0 through 7). The functions used to implement the above operations have an address associated with them, which address corresponds to the RFC 16 location being loaded. This address originates from either the function code register 28 or the control store 10. Thus, the RFC address is directly related to the type of data being delivered by the CPU 11, or as indicated by the function code.

In the serial processing of CIP instructions, it is necessary to detect certain characteristics of operands on a per unit basis and retain a record of the result of inspecting the entire operand for a given characteristic. Typically, it is necessary to know if at least one instance of a certain characteristic occurred. The logic of this requirement demands the ability to test for a given condition and retain a record of a detection of the condition. A further requirement is that the condition under test be sampled only at certain times during the operation of the CIP. One method of implementing this logic is to feedback the output of a register into an OR gate with the other input to such gate being the condition under test, and clocking the output of such gate to set the register. By this technique however, two clock pulses are required to insure that the register is not sensed while in an unstable state. Further, more logic is required for such technique than is required for the subject invention.

Figures 6, 7:
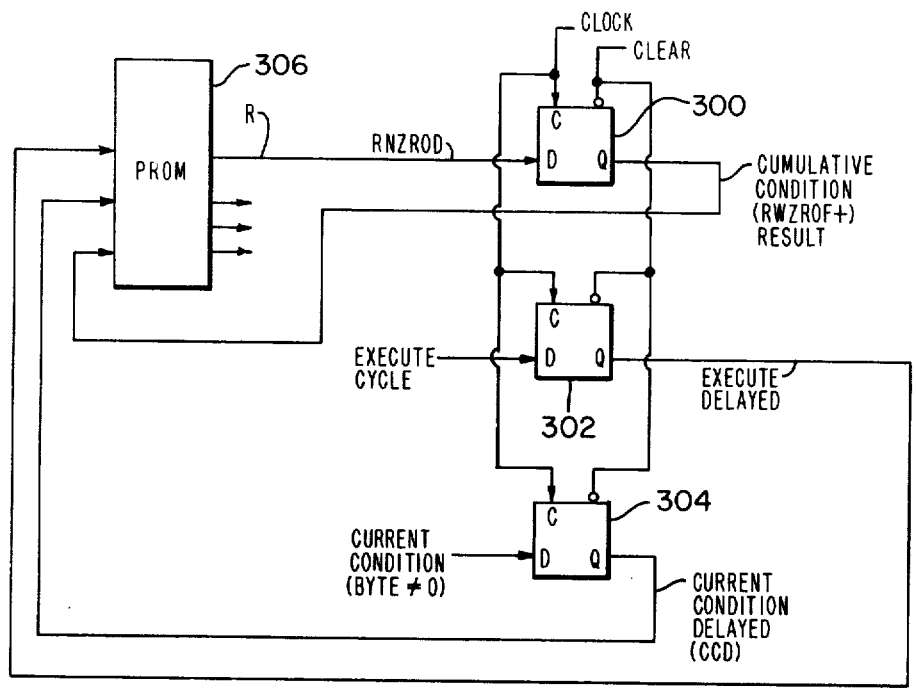
FIG. 6 is a schematic logic diagram of the condition code accumulator of the processor of the present invention.
FIG. 7 is a table illustrating the operation of the logic of FIG. 6.

FIG. 6 illustrates the implementation of the condition code logic of the present invention. For ease of explanation, only one of the condition codes is depicted, specifically the result not equal ($\neq$) to zero condition is shown in this diagram. The result $\neq$ to zero condition, which is the output of the flip-flop 300, when true indicates that the cumulative result of the particular instruction was not zeros. If the output is false, it indicates that the result of this instruction was, in fact, zero. The output of this result $\neq$ to zero condition is used to indicate to the system that the result of the current instruction which was just executed by the CIP was zero or $\neq$ to zero. The result $\neq$ to zero condition would be, for example, used in a decimal add instruction indicating that the sum of the two operands resulted in a zero result or indicating that for a decimal subtract condition that the difference of the two operands resulted in a zero condition, or also for a decimal compare instruction, that the two operands were equal, indicating that the result is zero.

The requirement of this condition code flip-flop 300 is such that as the result is being generated during the execution of the CIP instruction, this flip-flop should remain in the zero state and as soon as a first non-zero result byte is detected, the flop should be made to set to a one state indicating a result $\neq$ to zero condition and should remain in that state irrespective of any subsequent bytes being zero, thereby indicating that the entire result of this CIP instruction was not zero. During the execution of a CIP instruction which requires that these conditions be controlled, the first step made by the CIP firmware is to clear the condition. This is accomplished by use of the clear function on the flip-flop 300. This clear function also clears the flip-flop 302 which stores the fact that an execute cycle was performed by the CIP, and the flip-flop 304 which stores the result of the current operation being performed.

Initially, the cumulative condition is cleared, that is, the result ≠ to zero flip-flop 300 is set to the zero state indicating that the result in fact is zero before there is any identification of the result.

During the execution of the CIP instruction an execute cycle is performed. During the execute cycle, the result of the execution, which is the current condition on the D input of the flip-flop 34, is tested to be either a zero or a one. Depending on the current condition, the output of the flip-flop 304 is either set to a one or cleared to a zero at the occurrence of the CIP clock pulse, which occurs at the end of this execute cycle. The fact this was an execute cycle is also enabled on the D input of the flip-flop 302 which is set to indicate an execute delayed cycle after the occurrence of the CIP clock which is the output of the flip-flop 302. Since the CIP clock occurs in every firmware step, it is desirable to look at the current condition only if, in fact, an execute cycle occurred. Flip-flop 302 controls this sampling condition. It is desirable to remember the fact that an execute cycle just occurred, so that the current condition delayed may be used to control the result condition of the flip-flop 300. For example, if there was not an execute cycle which just occurred, the current condition, which is indicated by the input to flip-flop 304, is a free flowing input and the output of the flip-flop 304 is clocked unconditionally at every CIP clock time. However, the output of the flip-flop 300 should not be changed unless an execute cycle just occurred. Therefore, one needs the execute cycle flip-flop 302 as a controlling function to the input of the PROM chip 306 which controls the D input of the flip-flop 300.

The outputs of the three flops 300, 302 and 304, which represent the cumulative condition (result ≠ to zero flop), the execute delayed condition and the current condition delayed, respectively, are used as the address lines for the PROM chip 306. This PROM chip 306 uses similar other conditions which are not shown in FIG. 6 as address lines, and the four data lines inside the PROM 306 are used for D inputs to other result condition code flip-flops similar to the flip-flop 300. The coding of the PROM chip 306 is such that it takes the history condition which is on the flip-flop 300 and the execute delayed and the current condition delayed signals to address a location inside the PROM chip 306 which contains the information for the respective D bits of the condition codes. For example, if the condition code, result ≠ to zero flop 300 was a zero indicating that the result up to this point is, in fact, zero and there was no execute cycle, that is the output of the flip-flop 302 is zero, indicating that there had not been an immediately previous execute cycle, then the PROM 306 is coded such that the data output for that particular address is the same as the condition of the state of the flip-flop 300. In other words, the Q output of flip-flop 300 is forced into the D input of the flip-flop 300 irrespective of what the current condition delayed may be, whether either a zero or a one, since the current condition is only meaningful during an execute cycle.

The operation of the logic of FIG. 6 is best explained by use of the truth table of FIG. 7. In column 1 in the table of FIG. 7, CUM COND represents the cumulative condition which, in this exemplary case, would be the result ≠ to zero flip-flop 300. Column 2 EXEC DEL is the output of the flip-flop 302 indicating execute delayed. Column 3 (CCD) is the current condition delayed and is the output of the flip-flop 304. Column 4 (R) is the output of the PROM chip 306 which corresponds to one of the four output data bits from the PROM chip, of which only one is shown being used. In the present case, it is the one corresponding to the D input for the flip-flop 300 which is the result ≠ to zero bit (RNZROD).

Initially during the execution of the current CIP instruction, as mentioned earlier, the current condition is cleared to a zero (see the first line on the truth table, meaning the condition code is zero). If there has not been an execute delayed condition, this is indicated in Column 2 by a zero. In such case, irrespective of the output of the flip-flop 304 (Column 3), (the X indicating a don't care condition), the output R of the PROM chip is coded such that the CUM COND in Column 1, Row II, follows the output R inside the PROM chip. This table could be looked at using the first three columns as the address lines for the PROM chip 306 and the fourth column R being the data at the address indicated by such first three columns.

Similar to these three address lines, there could be more address lines for this PROM chip corresponding to the other conditions which need to be accumulated inside the CIP. Other conditions, for example, may arise when an illegal digit is detected during execution or when an overflow result is not zero.

Now referring to the second row in such table, if the current cumulative condition in Column 1 is a zero and there had just occurred an execute cycle as indicated in Column 2 (the execute delayed output being a 1) and there was encountered a current condition that was still a zero, then the output of PROM 306 (R) is still zero. Now these three inputs of 010 are used as an address to the PROM 306, and, at that time, since the current condition delayed is still a zero, the output R of the PROM chip is coded to a zero thereby recirculating the current condition and indicating that the result up to this point is still a zero. In subsequent execute cycles the results as in Row II would continue to happen, until the events of Row III are encountered. Row III illustrates the case where the cumulative condition is zero and the execute delayed is a one indicating that there was just an execute cycle, however, during this execute cycle there was in fact encountered a result which was not zero as indicated by Column 3 being a one. In this case the PROM chip is coded such that these three address lines, when having a code of 011, will force the R output of the PROM chip to be a one thereby indicating that the cumulative condition is going to change. At the occurrence of the clock time, the R output which is a one, is loaded into the flip-flop 300 thereby indicating that the result ≠ to zero condition has been set. After the occurrence of events of line III of the table, this results in the setting of the condition in the flip-flop 300. If any further execute cycles are performed irrespective of what the current condition is, the output R of the PROM chip is coded to follow the output Q of the flip-flop 300 thereby disabling the cumulative condition from being changed during any subsequent execute cycle as shown in Row IV wherein the fourth column (R) stays the same no matter what the results were as indicated (by an X meaning don't care) for the EXEC DEL and CCD columns. It is noted that the flip-flops 300, 302 and 304 and other such condition code flip-flops could be part of the same register, since they are being clocked by a master clock inside the CIP, thereby saving real estate on the board.

Having described the invention, what is claimed as new and novel and for which it is desired to secure Letters Patent is:

1. Apparatus for signalling the generation of predetermined condition codes in a data processing system, said apparatus comprising:
   A. first means for receiving a first signal having either a first state or a second state indicative of a predetermined condition code;
   B. second means for receiving a cycle timing signal;
   C. first storage means having a plurality of inputs and an output;
   D. second storage means having an input and an output, said input of said second storage means coupled to said output of said first storage means and said output of said second storage means coupled to a first of said inputs of said first storage means;
   E. means for coupling said first and second means for receiving to a second and third of said inputs respectively of said first storage means;
   F. third means for receiving a clock signal;
   G. means, included in said first storage means and responsive to the receipt of said clock signal and said cycle timing signal, as indicated by said third and second means for receiving, respectively, for supplying a signal at the output of said first storage means to cause the state of said second storage means to be set to the state of said first signal; and
   H. means also included in said first storage means for inhibiting a change in state of said second storage means when said second storage means is set to the second state of first signal, whereby said second storage means provides an indication of the past occurrence of said predetermined condition code.

2. Apparatus as in claim 1 wherein said second signal indicates a predetermined operation in said system.

3. Apparatus as in claim 2 wherein said predetermined operation is an instruction execution cycle.

4. Apparatus as in claim 1 wherein said second storage means is a bistable storage element.

5. Apparatus as in claim 4 wherein said bistable storage element provides means for coupling the input signal thereof to the output thereof in response to said clock signal.

6. Apparatus as in claim 1 wherein said first storage means is a memory element having a plurality of locations, said locations having predetermined indicia stored therein depending upon the address of each said location.

7. Apparatus as in claim 1 wherein said first and said second means for receiving each include a bistable storage means.

8. In a data processing system, apparatus for signalling the occurrence of a predetermined test condition within said system, said apparatus comprising:
   A. a memory means comprising a plurality of storage locations, each having an address, said locations having predetermined indicia stored therein depending upon the address of each of said locations;
   B. a bistable memory element having an input and an output;
   C. first means for receiving a first signal, indicative, if at a predetermined level, of the occurrence of a condition under test;
   D. second means for receiving a second signal indicative of a predetermined operation of said system;
   E. address means, responsive to the output of said bistable memory element, said first signal, and said second signal, for addressing a said location in said memory means;
   F. means, responsive to said addressing of said memory means, for reading out of said memory means the predetermined indicia stored at the location addressed by said address means and for supplying said indicia to the input of said bistable memory element;
   G. means for setting said bistable memory element to the state of the indicia read out from said memory means; and
   H. means, responsive to the setting of said bistable memory element to a state corresponding to said predetermined level of said first signal, for inhibiting any further change in the state of said element, whereby said indicia so stored in said element indicates that said condition under test has occurred at least once.

9. Apparatus as in claim 8 wherein said predetermined operation is an instruction execution cycle.

10. Apparatus as in claim 8 wherein said first and said second means for receiving each include a bistable memory element.

11. Apparatus as in claim 8 wherein said means G comprises:
   A. means for receiving a clock signal; and
   B. means responsive to said clock signal for setting said bistable memory element to the state of said indicia read out from said memory means.

* * * * *